July 30, 1963 H. B. CARROLL 3,099,179
HEADSTOCK FOR LATHE
Filed Oct. 8, 1958 2 Sheets-Sheet 1
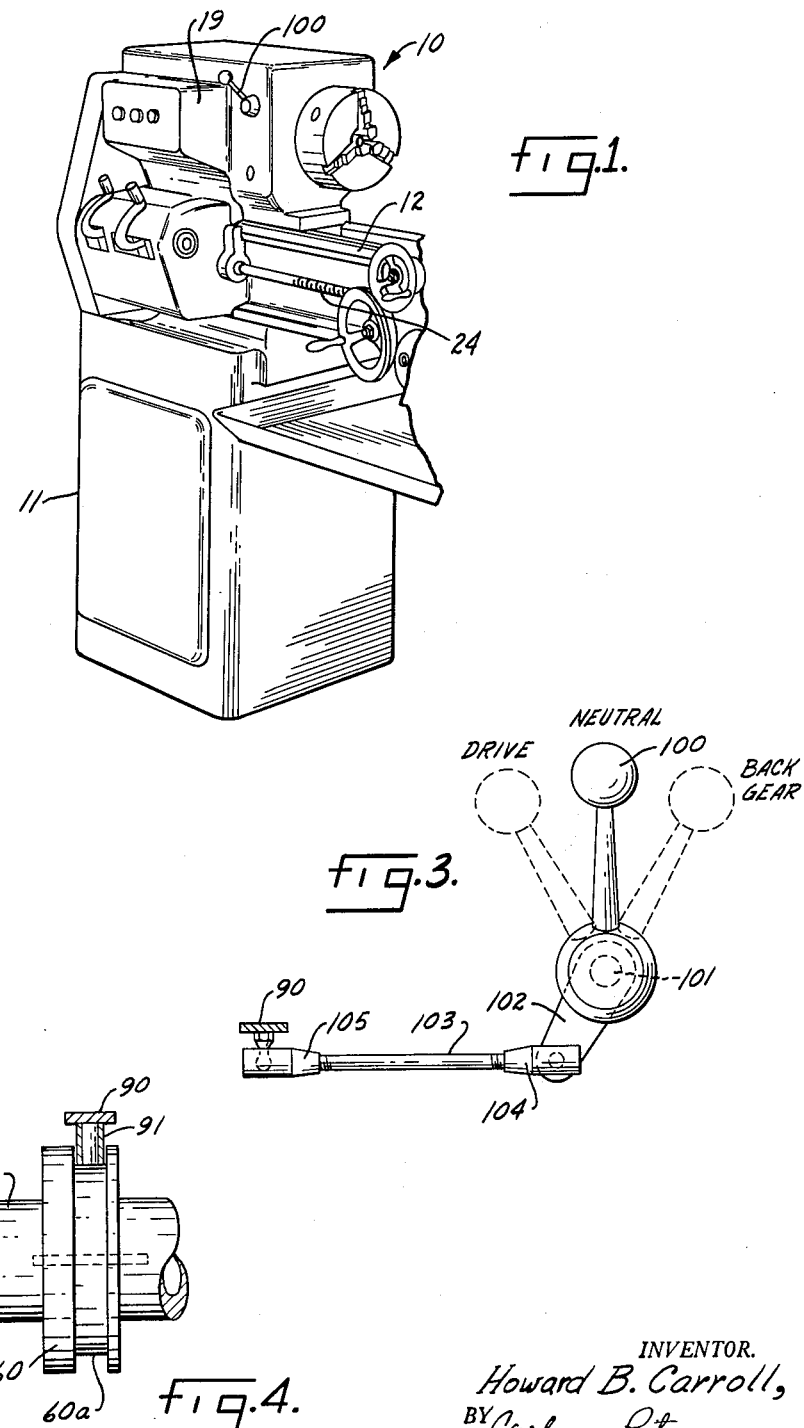
INVENTOR.
Howard B. Carroll,
BY Carlson, Pitzner,
Hubbard & Wolfe
Attorneys.

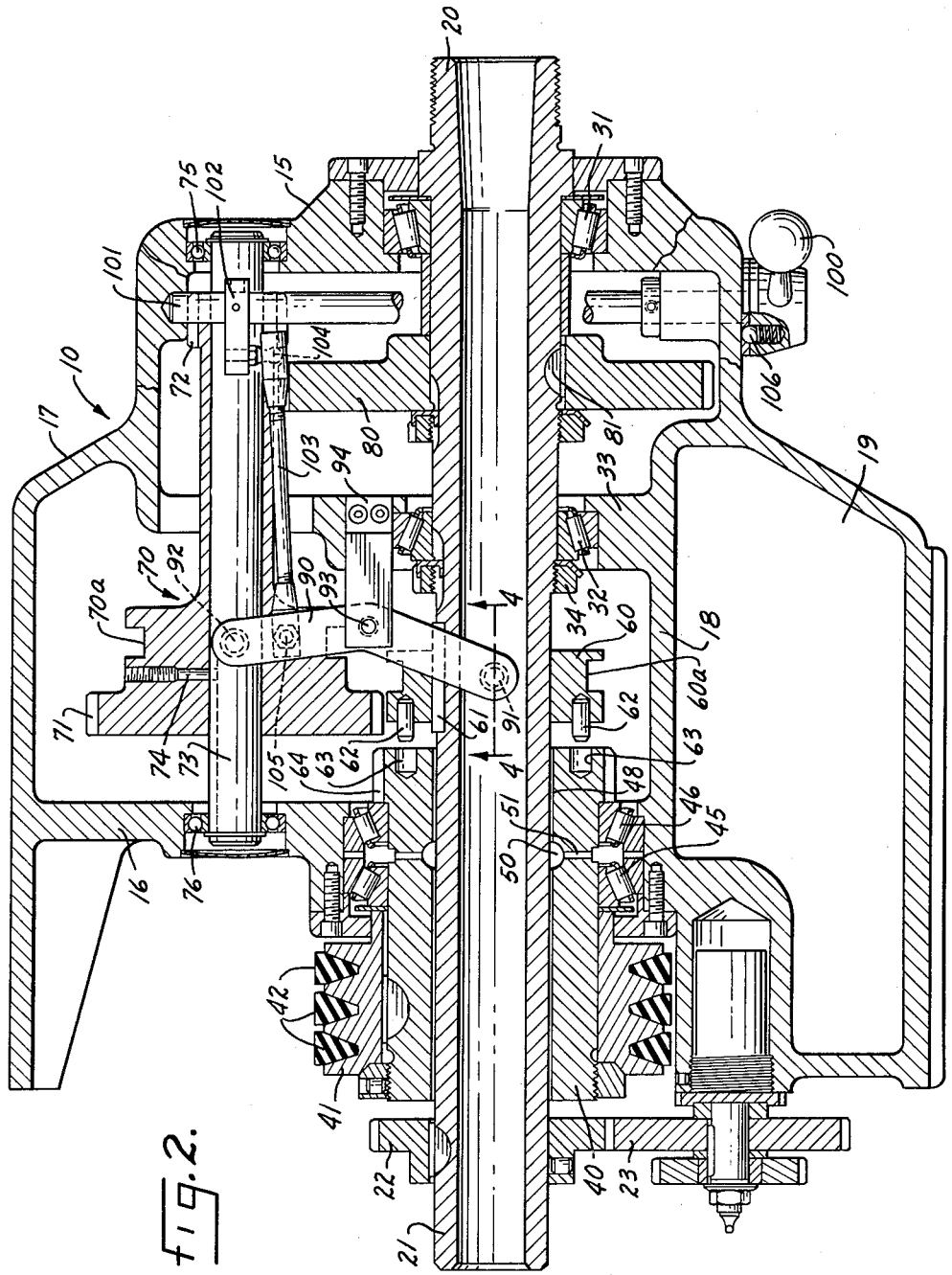

United States Patent Office 3,099,179
Patented July 30, 1963

3,099,179
HEADSTOCK FOR LATHE
Howard B. Carroll, Winnetka, Ill., assignor to Sheldon Machine Company, Inc., Chicago, Ill., a corporation of Illinois
Filed Oct. 8, 1958, Ser. No. 766,102
7 Claims. (Cl. 82—28)

The present invention relates to metal turning lathes and more particularly to an improved headstock construction.

It is an object of the present invention to provide a headstock construction having a novel combination of features enabling production of a lathe of highest quality and maximum accuracy and performance at a cost which is substantially less than lathes of comparable quality but of conventional design.

It is a more specific object to provide an improved lathe which is of the wrap-around belt drive type but in which the drive spindle is free of any belting loading or other laterally applied force. It is a related object of the invention to provide a lathe headstock in which the spindle is subjected only to the driving force or torque and which is therefore free to run true without any tendency to flex or whip, enabling production of a highly accurate finish free of gear marks or the like and permitting the boring of holes perfectly true and cylindrical.

It is another object to provide a headstock of the wrap-around belt drive type in which the driving sheave, which carries the driving belts, is separately supported in a novel fashion and isolated from the spindle. It is a further object to provide a driving arrangement employing a belt sheave in the form of a collar which is telescoped over the spindle but which is journaled for rotation in a set of bearings separate from the spindle bearings and with the sheave collar closely spaced to the spindle, yet maintained out of contact with it, so that lateral forces, regardless of origin, cannot be transmitted to the spindle.

It is still another object to provide a spindle mounting arrangement in which the spindle has no supporting contact with the driving end wall of the headstock but in which the spindle is nevertheless firmly secured in widely spaced bearings free of end or lateral play.

It is a further object to provide a novel headstock arrangement in which the sheave collar is journaled in the wall of an oiltight housing with a portion of the collar extending into the housing for coupling to the spindle by a coupling mechanism totally enclosed in the housing. It is a related object to provide a novel headstock in which both the spindle and a surrounding sheave collar extend through the housing separate from one another but with the oiltight integrity of the housing nevertheless maintained.

It is a further object of the invention to provide a headstock having the wrap-around belt type of drive with separate sheave and spindle but in which all of the shiftable moving parts are enclosed within a compact oiltight headstock housing.

It is another object of the invention to provide, in a headstock of the above type, means for coupling together the sheave and spindle either directly or through a set of back gears under the control of a single control member shiftable between "drive," "neutral" and "back gear" settings, a control which is readily accessible to the lathe operator.

It is a general object to provide a lathe headstock having all of the above features but which is nevertheless of inherently simple construction, capable of being manufactured and assembled at low cost and requiring minimum maintenance in the field.

Other objects and advantages of the invention will become apparent upon reading attached detailed description and upon reference to the drawings in which:

FIGURE 1 is a perspective view of the headstock portion of a lathe embodying the present invention.

FIG. 2 is a horizontal section through the headstock and headstock spindle but with the control shaft and shift linkage shown superimposed thereon.

FIG. 3 is a fragmentary front view of the control linkage.

FIG. 4 is a section along the line 4—4 in FIG. 2.

Turning now to the drawings, the headstock portion of a lathe embodying the invention, as shown in FIG. 1 consists of a headstock 10 on a frame or pedestal 11 and with ways 12 extending off to the right, the remainder of the lathe being, for purposes of this application, conventional. The headstock is of hollow box-like construction having a first end wall 15, a second or driving end wall 16, a back panel 17 and a front panel 18 cast integrally together. Also integrally formed on the front wall 18 is an enclosure 19 which forms a projection for housing certain pushbutton controls.

Extending through the end walls of the housing is a hollow spindle 20 which is threaded at its right hand end for acceptance of a chuck or the like. The tail end 21 of the spindle extends outwardly through the end wall 16 as shown for mounting of a driving gear 22 which is meshed with gearing 23 coupled to a lead screw 24 (FIG. 1).

In carrying out the present invention the spindle 20 is supported by bearings at widely spaced points but free of any connection with the driving end wall 16 for a purpose which will become clear as the discussion proceeds. Thus the spindle 20 is mounted in a first bearing 31, with the body of the spindle being supported within the housing in a second bearing 32 which is mounted in a massive partition 33 cast integrally into the housing and which is more or less centered between the end walls. The bearings 31, 32 are of the precision, tapered roller type permitting the taking up of any lateral and end play by means of a lockable take-up nut 34. The result is to produce a solid, frictionless support for the spindle capable of absorbing without deformation any side thrust which may be imparted to the spindle by the reaction between the tool and workpiece.

In accordance with the present invention a novel sheave and sheave mounting arrangement are employed for rotating the spindle 20 while maintaining the spindle isolated from lateral forces originating in the drive. Specifically a sheave collar 40 is provided carrying a sheave 41, with the sheave collar telescoped over the end of the spindle on a cantilever bearing support in the driving end wall and with small annular clearance provided between the sheave collar and the spindle. For the purpose of supporting the overhanging forces exerted upon the sheave 41 by reason of the driving V belts 42 wrapped therearound, the sheave collar is journaled in the end wall 16 in spaced bearings 45, 46 of the precision roller bearing tapered type. The size and spacing of the bearings is such as to maintain the sheave collar 40 in a fixed axial position so that it cannot come in contact with the spindle at any point along its length. The annular clearance space between the sheave collar 40 and the spindle, indicated at 48, is preferably on the order of 1/32 of an inch.

In accordance with one of the aspects of the invention the headstock housing forms a sealed oil bath for the parts enclosed therein, and provision is made to prevent loss of oil through the annular clearance space 48 between the collar 40 and the spindle. In the first place, leakage of oil through the space 48 is minimized because the parts are close together over a substantial axial length. However, any oil which may work its way along the clearance space 48 is diverted into an annular channel 50 cut internally in the collar 40 having radial drain passages 51 spaced about the periphery. Preferably the channel 50 and drain passages are alined with the bearings 45, 46 as shown, which not only disposes of the oil but which helps to maintain the bearings 45, 46 constantly lubricated. When the lathe is shut down, any excess oil which may be present in the channel 50 is drained back into the housing through the lowermost one of the passages 51.

In accordance with the present invention the collar 40 is extended inwardly into the headstock housing a short distance and means are provided at its inner end for coupling the collar to the spindle either directly or, alternatively, through back gearing which is included within the housing for rotation of the spindle at reduced speed. In the present instance direct coupling is brought about by providing on the spindle a drive collar 60 which is slidable on the spindle but keyed to it by a key 61. Mounted on the face of the collar 60 are a pair of pins 62 registering with oversize holes 63 formed in the opposed face of the collar 40. The pins 62 are preferably two in number and the holes 63 six in number in order to facilitate securing of a condition of register between them. Since the holes 63 are oversize, i.e., have radial clearance both inwardly and outwardly with respect to the pins which engage them, the only force which can be transmitted from the sheave collar 40 to the drive collar 60 is tangential, i.e., a force which will create torque in the spindle free of any lateral force components whatsoever. This constitutes an important practical advantage in the present construction to be more fully discussed at a later point.

Further in accordance with the present invention, back gearing is provided within the housing, with the inner end of the sheave collar 40 being formed as a gear for driving of the back gearing when the latter is shifted into position. In the present instance the gear on the inner end of the sheave collar is indicated at 64 for meshing with a back gear assembly 70. The latter includes a back gear 71 of relatively large diameter driving an integral pinion 72. The gear assembly 70 is slidably mounted on a shaft 73 to which it is keyed by a pin 74. The ends of the shaft 73 are mounted in ball bearings 75, 76 recessed in the end walls 15, 16 of the housing.

For the purpose of meshing with the pinion 72 of the back gear, a spindle gear 80 is mounted on the spindle and keyed thereto by a key 81 for establishing driving conditions at "back gear" speed, the back gear assembly 70 is slid along the shaft 73, simultaneously meshing gears 64, 71 at the input end and gears 72, 80 at the output end.

In accordance with one of the aspects of the invention a novel manually operable linkage is provided within the headstock housing for moving the drive collar 60 and the back gear assembly 70 alternatively into driving position and with a "neutral" position being provided in which both drives are disengaged. This is accomplished in the present instance by a horizontally arranged rocking member 90 having "collar engagement" at each of its ends with the slidable drive elements. Thus, an annular slot 60a is formed in the collar 60 and an annular slot 70a is formed in a back gear assembly 70 engageable by rollers 91, 92 secured to the ends of the lever 90. For the purpose of centrally pivoting the lever 90 a pivot 93 is provided mounted on a bracket 94 which is preferably secured to the partition 33 within the headstock housing.

According to one of the aspects of the invention the shift lever 90 is rocked about its pivot by linkage including a manual control arm conveniently accessible at the front of the housing. This manual control arm indicated at 100 is mounted at the forward end of a shaft 101 which carries a thrust arm 102 at its opposite end. Extending between the arm 102 and the lever 90 is a connecting rod 103 which has ball and socket connections at each of its ends as indicated at 104, 105. A detent 106 causes the control arm 100 to occupy one of three possible positions (FIG. 3) namely, "drive," "neutral" and "back gear." The linkage including the shift lever 90, the manual control arm 100, and the elements which interconnect them, actually lie above the plane of the spindle 20 but are nevertheless included in FIG. 2 to aid in understanding the device. And as illustrated the drive arrangement occupies the "neutral" position, with all of the driving elements disengaged so that the sheave collar rotates freely.

While the operation of the mechanism described above will become apparent from the description, it will be helpful to summarize it briefly. When it is desired to drive the spindle at high or normal speed, the control arm is moved to the "drive" position, which retracts the connecting rod 103 rotating the shift lever 90 in a clockwise direction thereby bringing the pins 62 into the opening 63 in the sheave collar 40. In the event that the elements 62, 63 are not initially alined, the chuck at the outer end of the spindle may be rotated slightly until the pins click into place. Power is then applied producing normal rotation of the spindle at a speed determined by the setting of the usual gear box. To actuate the back gearing the control arm is rocked in the opposite direction resulting in counterclockwise rocking of the lever 90. This serves, first of all, to retract the pins 62 as the control arm moves through the "neutral" position. As movement is continued the back gear assembly 70 moves to the left causing meshing between the back gears 71 and the gear 64 at the inner end of the sheave collar together with meshing between the pinion 72 and the spindle gear 80, so that when the sheave collar is rotated the spindle will rotate at a speed which is about one-sixth of the drive speed.

Experience with the present construction indicates a number of practical advantages which may not be appreciated at first glance even by those skilled in the art. In the first place, it is to be noted that a drive sheave is employed with multiple wrap-around belts. This avoids transmission of any gear vibrations into the spindle at normal spindle speeds thereby eliminating the "gear marks" in finally finished work which tend to become an increasing problem over the life of a lathe having a gear driven spindle. However, even more important than the absence of gear marks is the fact that the spindle in the present construction is entirely isolated from the driving means except for pure torque coupling between them. In conventional constructions the spindle is required to support the downward pull of the belts. While it might be expected that the spindle and spindle bearings could be designed to successfully resist such lateral force, our experience has shown that it is not possible within practical limits, to adequately take care of this type of loading, as a result of which conventional lathes suffer lateral flexing and "whipping" of the spindle seriously affecting the accuracy of the work which can be produced. Thus in a conventional lathe employing belts wrapped around the spindle it is difficult if not impossible to bore a perfectly round hole, and the hole will be oval by an amount anywhere from a few thousandths to a few tens of thousandths. Lathes including the present headstock design, by way of contrast, have an inherent accuracy for the various types of work to be performed, of better than two ten-thousandths of an inch, even under fully loaded conditions, i.e., with the driving motor developing a full three horsepower. The latter is adequate to take care of most of the lathe work in the usual industrial machine shop or tool room.

Moreover, any vibration which may develop in the bearings 45, 46 as a result of wear over a period of years cannot be transmitted to the spindle so that "like new" operation is substantially prolonged.

It is noteworthy that a lathe employing the present headstock design and possessing the above features may be constructed to operate within the above close limits of accuracy at a cost which is far less than one would expect to pay for a high quality lathe. Such cost reduction is brought about in part by the simplicity of the arrangement, thus, in spite of the fact that the spindle and drive are isolated from one another, the number of parts required to bring this about is a minimum and all of the parts are easily formed and assembled.

Since the operating parts are enclosed in an oil bath within the headstock housing, perfect lubrication is assured with little or no maintenance. The arrangement is, moreover, free of the usual dripping of oil. Thus in spite of the fact that no special oil seal is employed for bridging the annular gap 48 between the collar 40 and the spindle, the arrangement of the parts inherently reduces the oil flow, and any oil which does escape is effectively trapped before it can leave the housing.

I claim as my invention:

1. In a metal turning lathe a headstock comprising, in combination, a totally enclosed box-like housing having end walls, a spindle journaled in said housing and projecting beyond the end walls at each end, a sheave collar including a belt sheave telescoped over said spindle and journaled in the end wall of the housing at the drive end in a bearing providing cantilever support for said sheave against lateral belt forces, said sheave collar being closely spaced to said spindle and defining a long annular interspace extending substantially the entire length of said sheave collar, said sheave collar being extended a short distance into said housing and having torque coupling means at its inner end for coupling the collar to the spindle while preventing application of lateral forces from the collar to the spindle.

2. In a metal turning lathe a headstock comprising, in combination, a totally enclosed box-like housing having end walls, a spindle journaled in said housing and projecting beyond the end walls at each end, a sheave collar including a belt sheave telescoped over said spindle and journaled in the end wall of the housing at the drive end, said sheave collar being closely spaced to said spindle but out of contact therewith, said sheave collar being extended a short distance into said housing, a slidable drive collar keyed to said spindle and in opposed relation to said sheave collar, said collars being provided with axial pins and oversize pin receptacles respectively for transmission of pure torque between said sheave collar and said spindle.

3. In a metal turning lathe a headstock comprising in combination a totally enclosed box-like housing having end walls, a spindle journaled in said housing and projecting beyond the end walls at each end, a sheave collar including a belt sheave telescoped over said spindle and journaled in the end wall of the housing at the drive end, said sheave collar being closely spaced to said spindle but out of contact therewith, said sheave collar being extended into said housing and having coupling means at its inner end for coupling the collar to the spindle, and means including a control member extending through said housing and accessible by the lathe operator for operating said coupling means.

4. In a metal turning lathe a headstock comprising in combination a totally enclosed box-like housing having a first end wall, a driving end wall and a central partition spaced between them, a spindle journaled in said first end wall and in said central partition and extending outwardly beyond said end walls in both directions, a sheave collar including a drive sheave telescoped over said spindle and journaled in said drive end wall in axially spaced bearings, said sheave collar being extended axially into said housing, a back gear assembly journaled in said housing and slidable endwise, a drive gear on the inner end of said sheave collar, a drive collar keyed to said spindle, a driven gear on said spindle, a coupling at the inner end of said sheave collar for directly coupling the sheave collar to the spindle through the drive collar keyed thereon, means including a manual control member extending through said housing for alternatively (a) engaging said drive collar on said spindle with the drive sheave of said sheave collar, or (b) sliding said back gear assembly into meshed engagement with the drive gear on the inner end of said sheave collar and simultaneously into meshed engagement with said driven gear on the spindle, for operation of the spindle at respective speeds.

5. In a metal turning lathe a headstock comprising in combination a totally enclosed box-like housing having a first end wall, a driving end wall and a central partition spaced between them, a spindle journaled in said first end wall and in said central partition and extending outwardly beyond said end walls in both directions, a sheave collar including a drive sheave telescoped over said spindle and journaled in said drive end wall in axially spaced bearings, said sheave collar being extended axially into said housing, a back gear assembly journaled in said housing and slidable endwise, a drive gear on the inner end of said sheave collar, a driven gear on said spindle, a slidable drive collar on said spindle and having positive clutching means for coupling the sheave collar to the spindle, a shift lever engaging said drive collar and said back gear assembly for alternatively sliding the same into driving position, and manual control means including a manual control member extending through said housing for rocking said shift lever between its alternative positions.

6. In a metal turning lathe a headstock comprising in combination a totally enclosed box-like housing having a first end wall, a driving end wall and a central partition spaced between them, a spindle journaled in said first end wall and in said central partition and extending outwardly beyond said end walls in both directions, a sheave collar including a drive sheave telescoped over said spindle and journaled in said drive end wall in axially spaced bearings, said sheave collar being extended axially into said housing, a back gear assembly journaled in said housing and slidable endwise, a drive gear on the inner end of said sheave collar, a driven gear on said spindle, a slidable drive collar on said spindle and having positive clutching means for coupling the sheave collar to the spindle, a shift lever engaging said drive collar and said back gear assembly and rockable between limit positions for alternatively sliding the same into driving position, said shift lever having a central position in which the spindle drive is disengaged, and means including a manual control member extending through said housing for rocking said shift lever between its alternative positions.

7. In a metal turning lathe a headstock comprising in combination an enclosed box-like housing having a first end wall and a driving end wall, a spindle extending through said housing, a sheave collar including a sheave surrounding said spindle and interposed between the spindle and the driving end wall, said sheave collar being journaled in said driving end wall in a pair of spaced bearings for cantilever support of said sheave, a back gear assembly in said housing, said sheave collar being extended into said housing and having provision at its inner end for alternative coupling to said spindle directly and via said back gear assembly, said housing being flooded with oil, said sheave collar and said spindle defining a lengthy annular interspace, and means for transferring any oil flowing between said sheave collar and said spindle radially outward through said sheave collar and into said sheave collar bearing thereby to prevent escape of oil outwardly of said housing.

References Cited in the file of this patent

UNITED STATES PATENTS

| | | |
|---|---|---|
| 825,815 | Farnham | July 10, 1906 |
| 1,704,433 | Harris | Mar. 5, 1929 |
| 2,109,766 | Bullard | Mar. 1, 1938 |
| 2,347,259 | Groene | Apr. 25, 1944 |
| 2,631,072 | Montgomery | Mar. 10, 1953 |
| 2,689,031 | Heisler | Sept. 14, 1954 |
| 2,753,725 | De Vlieg | July 10, 1956 |

FOREIGN PATENTS

| | | |
|---|---|---|
| 269,246 | Switzerland | June 30, 1950 |